USOO9717099B2

(12) United States Patent
Korhonen et al.

(10) Patent No.: US 9,717,099 B2
(45) Date of Patent: Jul. 25, 2017

(54) PARALLEL PREAMBLE TRANSMISSION IN POWER LIMITED SITUATIONS

(71) Applicant: NOKIA TECHNOLOGIES OY, Espoo (FI)

(72) Inventors: Juha Korhonen, Espoo (FI); Esa Malkamaki, Espoo (FI); Claudio Rosa, Randers NV (DK); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 139 days.

(21) Appl. No.: 14/632,189

(22) Filed: Feb. 26, 2015

(65) Prior Publication Data

US 2015/0271851 A1 Sep. 24, 2015

(30) Foreign Application Priority Data

Mar. 21, 2014 (WO) ................ PCT/CN2014/073853

(51) Int. Cl.
*H04Q 7/00* (2006.01)
*H04W 74/08* (2009.01)
*H04L 29/06* (2006.01)
*H04W 52/00* (2009.01)
*H04W 76/04* (2009.01)
*H04L 29/08* (2006.01)

(52) U.S. Cl.
CPC ......... *H04W 74/0833* (2013.01); *H04L 69/22* (2013.01); *H04L 69/323* (2013.01); *H04W 52/00* (2013.01); *H04W 76/046* (2013.01); *Y02B 60/50* (2013.01)

(58) Field of Classification Search
CPC ............. H04W 74/0833; H04W 52/00; H04W 76/046; H04L 69/323; H04L 69/22

USPC ......................................... 370/329, 330, 331
See application file for complete search history.

(56) References Cited

U.S. PATENT DOCUMENTS

2006/0281463 A1* 12/2006 Yang .................... H04W 36/18
455/442
2012/0250631 A1 10/2012 Hakola et al.
(Continued)

FOREIGN PATENT DOCUMENTS

CN 1969488 A 5/2007
CN 102771173 A 11/2012

OTHER PUBLICATIONS

International Search Report and Written Opinion received for corresponding Patent Cooperation Treaty Application No. PCT/CN2014/073853, dated Dec. 24, 2014, 13 pages.

*Primary Examiner* — Chuong T Ho
(74) *Attorney, Agent, or Firm* — Squire Patton Boggs (US) LLP

(57) ABSTRACT

Various communication systems may benefit from parallel preamble transmissions. In particular, communication systems of the long term evolution of the third generation partnership project may benefit from methods and systems for parallel preamble transmission in power limited situations. A method can include determining at a physical layer of a device that a predetermined condition has been met with respect to a power limited situation. The method can also include communicating an indication that the predetermined condition has been met to a higher layer of the device based on the determining that the predetermined condition has been met.

36 Claims, 4 Drawing Sheets

(56) References Cited

U.S. PATENT DOCUMENTS

| | | | |
|---|---|---|---|
| 2013/0188580 A1* | 7/2013 | Dinan | H04W 52/281 370/329 |
| 2013/0215849 A1* | 8/2013 | Heo | H04W 52/365 370/329 |
| 2013/0250897 A1* | 9/2013 | Dinan | H04W 52/281 370/329 |
| 2013/0329675 A1* | 12/2013 | Dinan | H04W 52/281 370/329 |
| 2014/0064253 A1* | 3/2014 | Deivasigamani | H04W 36/30 370/332 |
| 2014/0307670 A1* | 10/2014 | Kim | H04W 72/0413 370/329 |
| 2014/0307681 A1* | 10/2014 | Feuersaenger | H04L 5/0007 370/329 |
| 2015/0208366 A1* | 7/2015 | Papasakellariou | H04W 52/244 370/311 |
| 2015/0215826 A1* | 7/2015 | Yamada | H04W 36/0072 455/436 |
| 2015/0215965 A1* | 7/2015 | Yamada | H04W 76/046 370/329 |
| 2016/0021624 A1* | 1/2016 | Feuersaenger | H04L 5/0007 370/329 |
| 2016/0057710 A1* | 2/2016 | Dinan | H04W 52/281 370/329 |
| 2016/0066224 A1* | 3/2016 | Deivasigamani | H04W 36/30 370/332 |
| 2016/0100432 A1* | 4/2016 | Dinan | H04W 52/281 370/336 |
| 2016/0249299 A1* | 8/2016 | Ahn | H04W 52/146 |

* cited by examiner

PARALLEL PREAMBLE TRANSMISSION IN POWER LIMITED SITUATIONS

BACKGROUND

Field

Various communication systems may benefit from parallel preamble transmissions. In particular, communication systems of the long term evolution of the third generation partnership project may benefit from methods and systems for parallel preamble transmission in power limited situations.

Description of the Related Art

The sum of total transmit (TX) power for a given user equipment (UE) is limited to a certain maximum value due to the physical limitations or regulatory requirements of the device. When the power sum of different simultaneous transmissions would exceed the threshold, a conventional UE does power scaling according to priority rules, which may—in some cases—lead to the UE completely dropping one of the transmissions. One situation in which simultaneous transmissions may take place is when the UE has overlapping random access procedures going on for a master cell group (MCG) and for a secondary cell group (SCG).

This situation can arise in long term evolution (LTE) release 12 with dual-connectivity. By contrast, in earlier releases the UE is allowed to continue only one random access procedure if a situation appears where two procedures would overlap. When MCG and SCG random access procedures overlap, UE may have to transmit overlapping preambles.

A particular issue is that while the medium access control (MAC) layer of the UE is triggering the physical (PHY) layer for preamble transmission, the MAC layer has no knowledge of the preamble powers. Therefore, the MAC layer does not know about the appearance of a power limited situation.

One way to avoid such a situation is for physical random access channel (PRACH) resources to be configured so that they never overlap in MCG and SCG. This would limit the RACH capacity, as resources would be divided between cells. Also, a certain level of synchronicity or at least knowledge of cell timings would be needed. Furthermore, dual-connectivity may need to be supported in asynchronous networks.

Semi-static power scaling would be an approach that could be used in situations where the needed maximum power of SCG preambles can be assumed to be so small that there would not be practical consequences for MCG preamble transmission if their maximum power is somewhat reduced because of the overlapping SCG preamble transmission.

SUMMARY

According to certain embodiments, a method can include determining at a physical layer of a device that a predetermined condition has been met with respect to a power limited situation. The method can also include communicating an indication that the predetermined condition has been met to a higher layer of the device based on the determining that the predetermined condition has been met.

In certain embodiments, a method can include receiving an indication, from a physical layer of a device, at a higher layer of the device. The indication can indicate that a predetermined condition has been met with respect to a power limited situation. The method can also include taking the indication into account at the higher layer when subsequently selecting resources for a master cell group and a secondary cell group.

A method, in certain embodiments, can include receiving, at a network element, an indication that a predetermined condition has been met with respect to a power limited situation for a user equipment. The method can also include controlling at least one of resource allocation, release, or handing over of the user equipment between a master cell group and a secondary cell group, based on the indication.

A non-transitory computer-readable medium can, according to certain embodiments, be encoded with instructions that, when executed in hardware, perform a process. The process can include any of the above-described methods.

A computer program product can, in certain embodiments, be encoded with instructions for performing a process. The process can include any of the above-described methods.

According to certain embodiments, an apparatus can include at least one processor and at least one memory including computer program code. The at least one memory and the computer program code can be configured to, with the at least one processor, cause the apparatus at least to determine at a physical layer of a device that a predetermined condition has been met with respect to a power limited situation. The at least one memory and the computer program code can also be configured to, with the at least one processor, cause the apparatus at least to communicate an indication that the predetermined condition has been met to a higher layer of the device based on determining that the predetermined condition has been met.

In certain embodiments, an apparatus can include at least one processor and at least one memory including computer program code. The at least one memory and the computer program code can be configured to, with the at least one processor, cause the apparatus at least to receive an indication, from a physical layer of a device, at a higher layer of the device. The indication can indicate that a predetermined condition has been met with respect to a power limited situation. The at least one memory and the computer program code can also be configured to, with the at least one processor, cause the apparatus at least to take the indication into account at the higher layer when subsequently selecting resources for a master cell group and a secondary cell group.

An apparatus, according to certain embodiments, can include means for determining at a physical layer of a device that a predetermined condition has been met with respect to a power limited situation. The apparatus can also include means for communicating an indication that the predetermined condition has been met to a higher layer of the device based on the determining that the predetermined condition has been met.

An apparatus, in certain embodiments, can include means for receiving an indication, from a physical layer of a device, at a higher layer of the device. The indication can indicate that a predetermined condition has been met with respect to a power limited situation. The apparatus can also include means for taking the indication into account at the higher layer when subsequently selecting resources for a master cell group and a secondary cell group.

According to certain embodiments, an apparatus can include at least one processor and at least one memory including computer program code. The at least one memory and the computer program code can be configured to, with the at least one processor, cause the apparatus at least to receive, at a network element, an indication that a predetermined condition has been met with respect to a power limited situation for a user equipment. The at least one memory and the computer program code can also be configured to, with the at least one processor, cause the apparatus at least to control at least one of resource allocation, release, or handing over of the user equipment between a master cell group and a secondary cell group, based on the indication.

In certain embodiments, an apparatus can include means for receiving, at a network element, an indication that a predetermined condition has been met with respect to a power limited situation for a user equipment. The apparatus can also include means for controlling at least one of resource allocation, release, or handing over of the user equipment between a master cell group and a secondary cell group, based on the indication.

BRIEF DESCRIPTION OF THE DRAWINGS

For proper understanding of the invention, reference should be made to the accompanying drawings, wherein.

DETAILED DESCRIPTION

Figure 1:
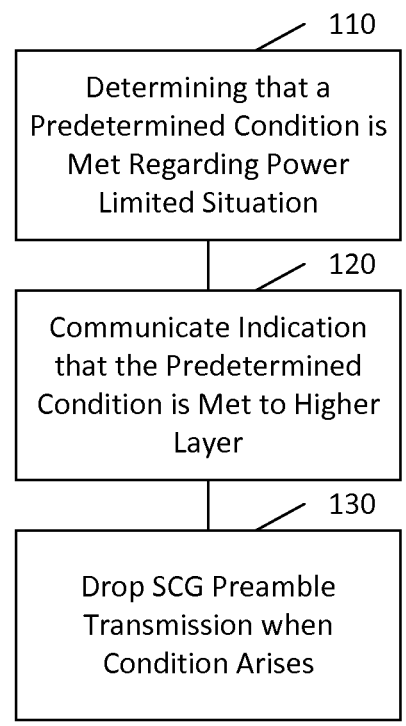
FIG. 1 illustrates a method according to certain embodiments.

Certain embodiments provide methods and systems that can properly handle and, in some cases minimize, the consequences of a power limited situation on parallel random access procedures. Thus, certain embodiments relate to dual-connectivity, which is discussed in a work item (WI) for LTE Rel. 12 WI, see 3GPP RP-132069, which is hereby incorporated herein by reference in its entirety. In dual-connectivity, the UE can be configured to use radio resources of Master and Secondary Cell Groups (MCG and SCG). In particular, certain embodiments address issues that may appear when the UE has random access (RA) procedures going on simultaneously for MCG and SCG.

More particularly, in certain embodiments PHY can indicate to MAC the power limited situation with respect to preamble transmission. This indication may trigger a variety of MAC actions, as discussed below.

For example, in a particular case, the PHY may indicate that the preamble powers have been scaled because of a power limitation. The MAC may take the indication into account by selecting SCG and MCG PRACH resources in a way that overlaps are avoided in the future. For example, in a particular case the MAC may postpone SCG preamble transmissions until finishing an MCG random access procedure. Alternatively, the SCG preamble can be postponed to the next available non-overlapping PRACH resource. The PHY may also or alternatively send the indication earlier when preambles are not overlapping but the power limited situation would appear if they were.

In a particular implementation, the PHY can drop, for example, an SCG preamble transmission completely if a power limited situation appears. The PHY can then feedback to the MAC an indication of a dropped preamble. The MAC can know exactly which preambles have been transmitted. The MAC can, thus, take into account dropping of preambles when setting preamble power: the repeated preambles are normally sent with increasing powers and this power increase is controlled by MAC that orders PHY to make relative power-up steps between repeatedly transmitted preambles. If MAC knows that PHY has not performed some preamble transmissions it can avoid excessive power ramp-up and unnecessarily large preamble power when the power limited situation disappears.

In certain embodiments, a new cause of random access problem can be specified for the case that SCG random access fails because the UE is not able to transmit preambles due to power limitation. The new cause could be an indication to radio resource control (RRC), subsequently reported to the master eNode B (MeNB), that dual connectivity may not be feasible for the UE. Based on such indication, the MeNB can decide instead to, for example, perform a handover from master to secondary eNB. More generally, an indication to RRC that power limitation happened during PRACH preamble transmission could also be signaled in cases where PRACH preamble transmission in one eNB overlaps with uplink transmissions other than PRACH, for example physical uplink control channel (PUCCH), physical uplink shared channel (PUCCH), sounding reference signal (SRS), or the like in the other eNB, resulting in power limitation being reached. This may occur even though, due to prioritization rules, this might not result in the PRACH preamble transmission being dropped or scaled in power.

In addition, the new type of random access problem indication could cause MAC and/or RRC to react differently depending on whether or not dedicated preambles are in use. Such a difference could be reasonable because release of dedicated preambles could be desirable to happen, irrespective of the cause of the random access problem, within a certain time so that eNB knows it can be allocated to other UEs, while contention based procedure could be continued more freely despite of preamble transmission delays.

On a more detailed level, non-contention based random access (RA) could be handled differently. For example, a dedicated preamble can be released within a certain time, with a timer or a separate counter that increases at every preamble occasion. The counter can be different from the one for the preamble transmission counting that does not increase if the preamble drops when collision happens. Thus, the eNB can know the resources for the dedicated preamble can be allocated to other UEs irrespective of the cause of the random access problem. When the dedicated preamble is released, the new type of random access problem can be indicated to RRC and reported to the MeNB. Although contention based procedure could be continued more freely despite preamble transmission delay, the indication on power problem to the eNB could apply to contention based RA as well.

The above embodiments can be implemented in various ways. For example, a medium access control (MAC) specification, such as that described at 3GPP technical specification (TS) 36.321, could be modified to require postponement of SCG preamble transmission if the physical layer has indicated power limitation. For example, it could be specified that, for SCG the UE shall take into account the possible occurrence of overlapping preamble transmission in MCG in case preamble power limitation has been indicated by physical layer. The entirety of 3GPP TS 36.321 is hereby incorporated herein by reference.

This alternative may be simple to implement into MAC specifications. However, in this case release of the dedicated preamble may also be postponed.

There are alternative ways of handling ending of SCG random access procedure whose preamble transmissions have been delayed because of power limited situation. One way is to specify that MAC increases preamble count as if postponed preambles, or those indicated by PHY as not transmitted, were actually transmitted. This could be one way of releasing dedicated preambles in a similar time as they would be released without delayed preambles. Another way is by introducing a timer or another counter for releasing dedicated preambles so that the eNB knows when the dedicated preamble can be allocated to other UEs, regardless of whether or not there is collision and preamble dropping due to power limitation for this UE. The current preamble counter may count only transmitted preambles. Then the preamble power could be directly obtained from the preamble count, as it presently is, without any larger power steps due to counted but not transmitted preambles.

FIG. 1 illustrates a method according to certain embodiments. The method of FIG. 1 may be performed by, for example, a user equipment. The method may include, at 110, determining at a physical layer of a device that a predetermined condition has been met with respect to a power limited situation. The predetermined condition can be that the power limited situation has arisen or that the power limited situation may arise if preamble transmissions to a master cell group and a secondary cell group overlap. Thus, the predetermined condition can be merely that the power limited situation is at particular risk of arising.

The method may also include, at 120, communicating an indication that the predetermined condition has been met to a higher layer of the device based on the determining that the predetermined condition has been met. The higher layer can include at least one of the medium access control layer or the radio resource control layer. The indication can be an indication of a random access problem due to power limitation.

The method can also include, at 130, the physical layer dropping a secondary cell group preamble transmission completely when the power limited situation arises. The indication can be communicated by reporting the dropped preamble transmission to the higher layer.

Figure 2:
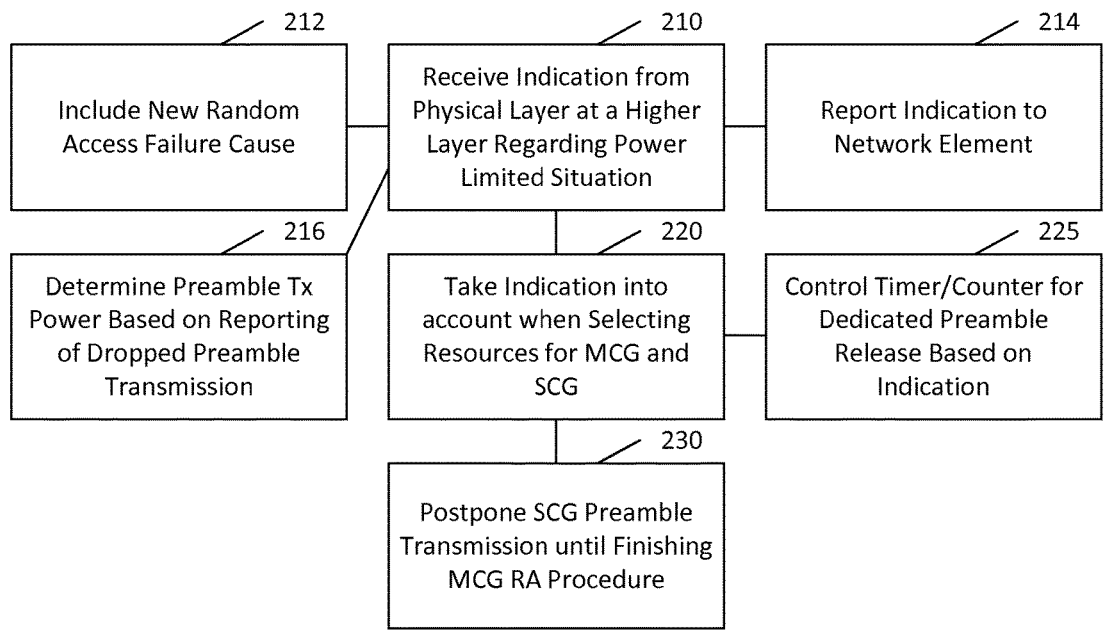
FIG. 2 illustrates another method according to certain embodiments.

FIG. 2 illustrates another method according to certain embodiments. The method of FIG. 2 can also be performed by a user equipment. Moreover, the method of FIG. 2 can be used together with the method of FIG. 1.

As shown in FIG. 2, the method can include, at 210, receiving an indication, from a physical layer of a device, at a higher layer of the device. The indication can indicate that a predetermined condition has been met with respect to a power limited situation. For example, the indication can include an indication of a random access problem due to power limitation.

The method can also include, at 220, taking the indication into account at the higher layer when subsequently selecting resources for a master cell group and a secondary cell group. The taking the indication into account can include, at 230, postponing secondary cell group preamble transmission until finishing a master cell group random access procedure. Alternatively, the taking into account can include postponing secondary cell group preamble transmission until the next available PRACH resource not overlapping with master cell group preamble transmission. Taking the indication into account can be contingent upon whether dedicated preambles are in use.

Thus, the method can also involve including, at 212, a new random access failure cause with or as the indication. The method can also include, at 214, the device reporting the indication to a network element such as an MeNB. The reporting may be performed, for example, using radio resource control (RRC) signaling. The method can also include, at 216, determining preamble transmission (Tx) power based on reporting of dropped preamble transmission.

The method can also include, at 225, controlling a timer or counter for release of a dedicated preamble, based on the indication. For example, a dedicated preamble can be released within a certain time, with a timer or a separate counter that increases at every preamble occasion. The counter can be different from the one for the preamble transmission counting that does not increase if the preamble drops when collision happens.

Figure 3:
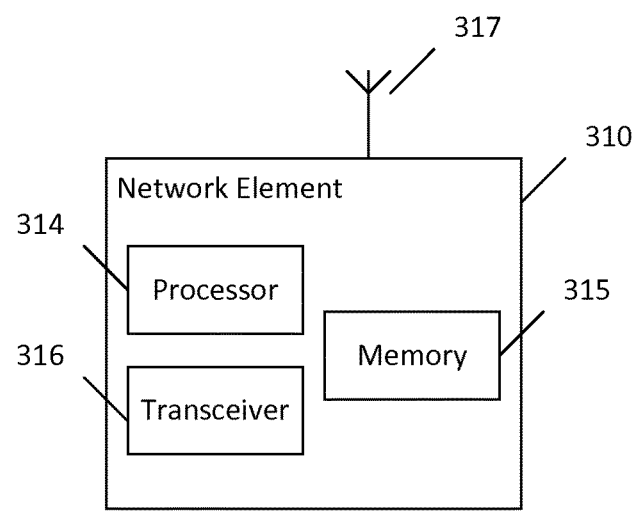
FIG. 3 illustrates a system according to certain embodiments.
Figure 3:
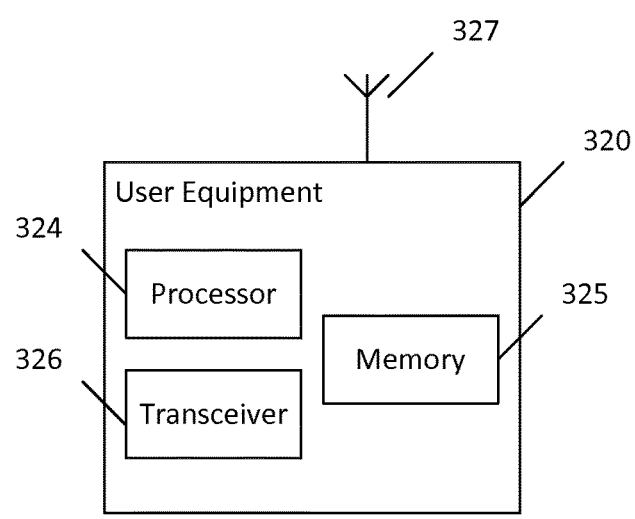

FIG. 3 illustrates a system according to certain embodiments. It should be understood that each block of the flowchart of FIG. 1, 2, or 4 and any combination thereof may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), server, host or any other network element discussed herein or the like. Each of these devices may include at least one processor or control unit or module, respectively indicated as 314 and 324. At least one memory may be provided in each device, and indicated as 315 and 325, respectively. The memory may include computer program instructions or computer code contained therein. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna. Likewise, some network elements 310 may be solely configured for wired communication, and in such cases antenna 317 may illustrate any form of wired communication hardware, such as a network interface card.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network element deliver local content. One or more functionalities may also be implemented as virtual application(s) in software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In an exemplary embodiment, an apparatus, such as a node or user device, may include means for carrying out embodiments described above in relation to FIG. 1, 2, or 4.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIGS. 1, 2, and 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. The UE 320 may likewise be provided with a variety of configurations for communication other than communication network element 310. For example, the UE 320 may be configured for device-to-device communication.

Figure 4:
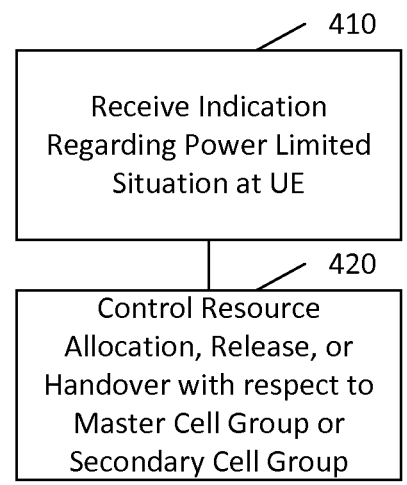
FIG. 4 illustrates a further method according to certain embodiments.

FIG. 4 illustrates a further method according to certain embodiments. The method of FIG. 4 may be used together with the method of FIGS. 1 and 2 in a wireless network. As shown in FIG. 4, a method can include, at 410, receiving, at a network element, an indication that a predetermined condition has been met with respect to a power limited situation for a user equipment. The method can also include, at 420, controlling at least one of resource allocation, release, or handing over of the user equipment between a master cell group and a secondary cell group, based on the indication. The release may, for example, be an SeNB release procedure. The handover may be, for example, a handover to SeNB or to a different MeNB.

At least one dedicated preamble may be in use, as mentioned above, and may be released afterwards within a certain time. The controlling can, in such a case, include the at least one dedicated preamble being allocated to another user equipment.

Certain embodiments may provide various benefits or advantages. For example, in certain embodiments the MeNB may be able to get an indication of UE power limitation with dual connectivity already during the RACH procedure towards the SeNB, which might be used to more quickly detect possible unfeasibility of dual connectivity. Furthermore, certain embodiments may provide for faster release of dedicated PRACH resources in case RACH procedures would need to take long time due to simultaneous PRACH transmission toward MeNB and SeNB.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
    determining at a physical layer of a device that a predetermined condition has been met with respect to a power limited situation; and
    communicating an indication that the predetermined condition has been met to a higher layer of the device based on the determining that the predetermined condition has been met, wherein the predetermined condition is that the power limited situation has arisen or that the power limited situation may arise if preamble transmissions to a master cell group and a secondary cell group overlap.

2. The method of claim 1, wherein the higher layer comprises at least one of a medium access control layer or a radio resource control layer.

3. The method of claim 1, wherein the indication comprises an indication of a random access problem due to power limitation.

4. The method of claim 1, further comprising:
    reporting, by the device, the indication to a network element.

5. A method, comprising:
    determining at a physical layer of a device that a predetermined condition has been met with respect to a power limited situation; and
    communicating an indication that the predetermined condition has been met to a higher layer of the device based on the determining that the predetermined condition has been met, wherein the physical layer drops a secondary cell group preamble transmission completely when the power limited situation arises.

6. The method of claim 5, further comprising:
    reporting the dropped preamble transmission to the higher layer as the indication.

7. The method of claim 6, further comprising: determining preamble transmission power based on the earlier reporting of the dropped preamble transmission.

8. The method of claim 5, wherein the higher layer comprises at least one of a medium access control layer or a radio resource control layer.

9. The method of claim 5, wherein the indication comprises an indication of a random access problem due to power limitation.

10. The method of claim 5, further comprising:
reporting, by the device, the indication to a network element.

11. An apparatus, comprising:
at least one processor; and
at least one memory including computer program code,
wherein the at least one memory and the computer program code are configured to, with the at least one processor, cause the apparatus at least to:
determine at a physical layer of a device that a predetermined condition has been met with respect to a power limited situation; and
communicate an indication that the predetermined condition has been met to a higher layer of the device based on determining that the predetermined condition has been met, wherein the predetermined condition is that the power limited situation has arisen or that the power limited situation may arise if preamble transmissions to a master cell group and a secondary cell group overlap.

12. The apparatus of claim 11, wherein the higher layer comprises at least one of a medium access control layer or a radio resource control layer.

13. The apparatus of claim 11, wherein the indication comprises an indication of a random access problem due to power limitation.

14. The apparatus of claim 11, wherein the at least one memory and the computer program code are configured to, with the at least one processor, cause the apparatus at least to report the indication to a network element.

15. An apparatus, comprising:
at least one processor; and
at least one memory including computer program code,
wherein the at least one memory and the computer program code are configured to, with the at least one processor, cause the apparatus at least to:
determine at a physical layer of a device that a predetermined condition has been met with respect to a power limited situation; and
communicate an indication that the predetermined condition has been met to a higher layer of the device based on determining that the predetermined condition has been met, wherein the physical layer is configured to drop a secondary cell group preamble transmission completely when the power limited situation arises.

16. The apparatus of claim 15, wherein the at least one memory and the computer program code are further configured to, with the at least one processor, cause the apparatus at least to report the dropped preamble transmission to the higher layer as the indication.

17. The apparatus of claim 16, wherein the at least one memory and the computer program code are configured to, with the at least one processor, cause the apparatus at least to determine preamble transmission power based on the earlier reporting of the dropped preamble transmission.

18. The apparatus of claim 15, wherein the higher layer comprises at least one of a medium access control layer or a radio resource control layer.

19. The apparatus of claim 15, wherein the indication comprises an indication of a random access problem due to power limitation.

20. The apparatus of claim 15, wherein the at least one memory and the computer program code are configured to, with the at least one processor, cause the apparatus at least to report the indication to a network element.

21. An apparatus, comprising:
at least one processor; and
at least one memory including computer program code,
wherein the at least one memory and the computer program code are configured to, with the at least one processor, cause the apparatus at least to:
determine at a physical layer of a device that a predetermined condition has been met with respect to a power limited situation;
communicate an indication that the predetermined condition has been met to a higher layer of the device based on determining that the predetermined condition has been met; and
determine that a dedicated preamble is released within a certain time, with a timer or a separate counter that increases at every preamble occasion.

22. The apparatus of claim 21, wherein the at least one memory and the computer program code are further configured to, with the at least one processor, cause the apparatus at least to report a new type of random access problem to a master cell.

23. The apparatus of claim 21, wherein the higher layer comprises at least one of a medium access control layer or a radio resource control layer.

24. The apparatus of claim 21, wherein the indication comprises an indication of a random access problem due to power limitation.

25. The apparatus of claim 21, wherein the at least one memory and the computer program code are configured to, with the at least one processor, cause the apparatus at least to report the indication to a network element.

26. An apparatus, comprising:
at least one processor; and
at least one memory including computer program code,
wherein the at least one memory and the computer program code are configured to, with the at least one processor, cause the apparatus at least to
receive an indication, from a physical layer of a device, at a higher layer of the device, wherein the indication indicates that a predetermined condition has been met with respect to a power limited situation; and
take the indication into account at the higher layer when subsequently selecting resources for a master cell group and a secondary cell group.

27. The apparatus of claim 26, wherein the at least one memory and the computer program code are configured to, with the at least one processor, cause the apparatus at least to take the indication into account by postponing secondary cell group preamble transmission until finishing a master cell group random access procedure or until a next available random access channel resources not overlapping with a master cell group preamble transmission.

28. The apparatus of claim 26, wherein the indication comprises an indication of a random access problem due to power limitation.

29. The apparatus of claim 26, wherein the at least one memory and the computer program code are configured to, with the at least one processor, cause the apparatus at least to take the indication into account contingent upon whether dedicated preambles are in use.

30. An apparatus, comprising:
at least one processor; and
at least one memory including computer program code,
wherein the at least one memory and the computer program code are configured to, with the at least one processor, cause the apparatus at least to
receive, at a network element, an indication that a predetermined condition has been met with respect to a power limited situation for a user equipment; and
control at least one of resource allocation, release, or handing over of the user equipment between a master cell group and a secondary cell group, based on the indication.

31. The apparatus of claim 30, wherein at least one dedicated preamble is in use and is released afterwards within a certain time, and wherein the at least one memory and the computer program code are configured to, with the at least one processor, cause the apparatus at least to control by allocating the at least one dedicated preamble to another user equipment.

32. A method, comprising:
determining at a physical layer of a device that a predetermined condition has been met with respect to a power limited situation;
communicating an indication that the predetermined condition has been met to a higher layer of the device based on the determining that the predetermined condition has been met; and
determining that a dedicated preamble is released within a certain time, with a timer or a separate counter that increases at every preamble occasion.

33. The method of claim 32, further comprising:
reporting a new type of random access problem to a master cell.

34. The method of claim 32, wherein the higher layer comprises at least one of a medium access control layer or a radio resource control layer.

35. The method of claim 32, wherein the indication comprises an indication of a random access problem due to power limitation.

36. The method of claim 32, further comprising:
reporting, by the device, the indication to a network element.

* * * * *